United States Patent
Marsch

(10) Patent No.: US 10,656,246 B2
(45) Date of Patent: May 19, 2020

(54) MISALIGNMENT ESTIMATION FOR A VEHICLE RADAR SYSTEM

(71) Applicants: Sebastian Marsch, Schweinfurt (DE); VEONEER SWEDEN AB, Vargarda (SE)

(72) Inventor: Sebastian Marsch, Schweinfurt (DE)

(73) Assignee: VEONEER SWEDEN AB, Vargarda (SE)

( * ) Notice: Subject to any disclaimer, the term of this patent is extended or adjusted under 35 U.S.C. 154(b) by 314 days.

(21) Appl. No.: 15/735,079

(22) PCT Filed: Jun. 10, 2016

(86) PCT No.: PCT/EP2016/063241
§ 371 (c)(1),
(2) Date: Dec. 8, 2017

(87) PCT Pub. No.: WO2016/198563
PCT Pub. Date: Dec. 15, 2016

(65) Prior Publication Data
US 2020/0033444 A1   Jan. 30, 2020

(30) Foreign Application Priority Data
Jun. 11, 2015   (EP) .................................. 15171549

(51) Int. Cl.
*G01S 7/40* (2006.01)
*G01S 13/93* (2020.01)
(Continued)

(52) U.S. Cl.
CPC .......... *G01S 7/4026* (2013.01); *G01S 13/723* (2013.01); *G01S 13/931* (2013.01); *G01S 13/343* (2013.01);
(Continued)

(58) Field of Classification Search
CPC combination set(s) only.
See application file for complete search history.

(56) References Cited

U.S. PATENT DOCUMENTS 5,986,601 A   11/1999   Sugimoto
6,202,027 B1   3/2001   Alland et al.
(Continued)

FOREIGN PATENT DOCUMENTS

DE   197 51 004 A1   5/1999
DE   199 64 020 A1   7/2001
(Continued)

OTHER PUBLICATIONS

International Search Report of PCT/EP2016/063241 dated Aug. 12, 2016.

*Primary Examiner* — Mamadou L Diallo
(74) *Attorney, Agent, or Firm* — Dickinson Wright PLLC

(57) ABSTRACT

A vehicle radar system (2) having a radar detector (3) arranged to detect at least one stationary object (10) a plurality of times when a vehicle (1) moves in relation to it. A plurality of detected positions (11, 12, 13) are obtained in a local coordinate system (15), fixed with respect to the radar detector (3). The object (10) is stationary with respect to a global coordinate system (16), fixed with respect to the environment. A position detector (14) is arranged to detect its present movement conditions with reference to the global coordinate system (16). Correction factors are applied on each detected position of the object in the local coordinate system (15). Obtained corrected detected positions are then transformed into the global coordinate system (16) and an error/cost value is calculated for each correction factor. The correction factor that results in the smallest error/cost value is chosen.

14 Claims, 4 Drawing Sheets

(51) Int. Cl.
*G01S 13/72* (2006.01)
*G01S 13/931* (2020.01)
*G01S 13/34* (2006.01)

(52) U.S. Cl.
CPC . *G01S 2007/403* (2013.01); *G01S 2013/9353* (2013.01); *G01S 2013/9357* (2013.01); *G01S 2013/9375* (2013.01)

(56) References Cited

U.S. PATENT DOCUMENTS

| | | |
|---|---|---|
| 7,443,335 B2 | 10/2008 | Kai et al. |
| 9,500,742 B2 | 11/2016 | Poiger et al. |
| 10,496,104 B1* | 12/2019 | Liu .................. G01S 19/14 |
| 2002/0044082 A1 | 4/2002 | Woodington et al. |
| 2004/0095269 A1* | 5/2004 | Uehara ................ G01S 7/023 |
| | | 342/92 |
| 2005/0278098 A1* | 12/2005 | Breed ............. B60R 21/0134 |
| | | 701/45 |
| 2015/0219758 A1* | 8/2015 | Gammenthaler ....... G01S 13/60 |
| | | 382/103 |
| 2017/0010121 A1* | 1/2017 | Shashua ................ G01C 21/32 |
| 2017/0038477 A1* | 2/2017 | Schmid .................. G01S 19/51 |
| 2017/0057545 A1* | 3/2017 | Laur ................ B62D 15/0265 |
| 2017/0177958 A1* | 6/2017 | Yamanoi .............. G01C 21/30 |

FOREIGN PATENT DOCUMENTS

| | | |
|---|---|---|
| GB | 2 334 842 A | 1/1999 |
| GB | 2 363 016 A | 5/2001 |
| WO | WO 2014/003615 | 1/2014 |

* cited by examiner

MISALIGNMENT ESTIMATION FOR A VEHICLE RADAR SYSTEM

CROSS-REFERENCE TO RELATED APPLICATIONS

This application is a 35 U.S.C. § 371 national phase application of PCT International Application No. PCT/EP2016/063241, filed Jun. 10, 2016, which claims the benefit of priority under 35 U.S.C. § 119 to European Patent Application No. 15171549.7, filed Jun. 11, 2015, the contents of which are incorporated herein by reference in their entirety.

FIELD OF THE INVENTION

The present disclosure relates to a vehicle radar system arranged to detect objects outside a vehicle, where the radar system includes a radar detector and a processing unit.

BACKGROUND

Today, a radar device may be mounted on a motor vehicle in order to detect reflections from surrounding objects in order to implement functions of speed control and collision prevention, among other functions. In such a radar device it is required to obtain an azimuth angle in the form of a target bearing angle, a distance with respect to the object and a relative speed between the vehicle and the object.

For most vehicle radar applications it is important to measure the target bearing angle with very high precision. The angle accuracy of a radar system depends on fundamental parameters like modulation technique, antenna design, component tolerances, assembly precision and/or installation conditions. Furthermore, due to various environmental influences such as mechanical stress or bad weather, the angle estimation performance might suffer additionally. Some of those error sources show a random statistical distribution while others lead to a fixed angle offset. This fixed offset is the so called misalignment angle. Monitoring the misalignment angle is often an essential requirement in vehicle applications.

There are several approaches known which use vehicle dynamic information, e.g. vehicle speed, yaw-rate or steering angle, to verify trajectories of ground stationary targets. By comparing the expected path of an obstacle with the actual progression of the radar observations, one should be able to estimate the common bearing bias. The success of these techniques highly depends on the precisions of the vehicle dynamic data.

Addressing the above problems, U.S. Pat. No. 7,443,335 discloses angle error estimation for a vehicle radar based on relative speeds and reflections.

Furthermore, WO 2014/003615 discloses detection of radar detector misalignment by finding zero crossings for a derivative of a function describing the progression of detected target Doppler velocity as a function of detected target angle.

However, there is a need for finding a reliable and uncomplicated error compensation for a vehicle radar, which constitutes an object of the present disclosure.

SUMMARY OF INVENTION

The above-mentioned object is achieved by use of a vehicle radar system that is arranged to detect objects outside a vehicle. The radar system includes a radar detector and a processing unit, where the radar detector is arranged to detect at least one stationary object a plurality of times when moving in relation to the stationary object such that plurality of detected positions is obtained in a local coordinate system that is fixed with respect to the radar detector. The stationary object is stationary with respect to a global coordinate system that is fixed with respect to the environment outside the vehicle. The radar system also includes a position detector that is arranged to detect its present movement conditions with reference to the global coordinate system. The processing unit is arranged to:

Apply a plurality of correction factors on each detected position of the stationary object in the local coordinate system such that a plurality of corrected detected positions is obtained.

Transform all corrected detected positions into the global coordinate system.

Calculate an error/cost value for each correction factor.

Choose the correction factor that results in the smallest error/cost value.

The above-described object is also achieved by use of a method for estimating a vehicle radar system misalignment, where the vehicle radar system is used for detecting objects outside a vehicle. The method includes:

Detecting at least one stationary object a plurality of times when moving in relation to the stationary object such that plurality of detected positions is obtained in a local coordinate system that is fixed with respect to the radar detector. The stationary object is stationary with respect to a global coordinate system that is fixed with respect to the environment outside the vehicle.

Applying a plurality of correction factors on each detected position of the stationary object in the local coordinate system such that a plurality of corrected detected positions is obtained.

Transforming all corrected detected positions into the global coordinate system.

Calculating an error/cost value for each correction factor.

Choosing the correction factor that results in the smallest error/cost value.

Each error/cost value is obtained by adding the distances between the transformed and corrected detected positions of successive radar cycles.

According to an example of the present invention, each error/cost value is obtained by variance or mean value calculations.

According to another example of the invention, the processing unit is arranged to find a minimum of the error/cost function by use of interpolation, slope analysis, non-linear optimization techniques and/or curve-fitting.

According to another example of the invention, the position detector is constituted by one or more accelerometers, one or more vehicle dynamics acquisition arrangements, one or more cameras, one or more gyrometers or a GPS (Global Positioning System) arrangement.

Other examples are disclosed in the following description and appended drawings.

A number of advantages are obtained by the present disclosure; mainly a reliable and uncomplicated error compensation for a vehicle radar is provided.

BRIEF DESCRIPTION OF THE DRAWINGS

The present disclosure will now be described more in detail with reference to the appended drawings, where.

DETAILED DESCRIPTION

Figure 1:
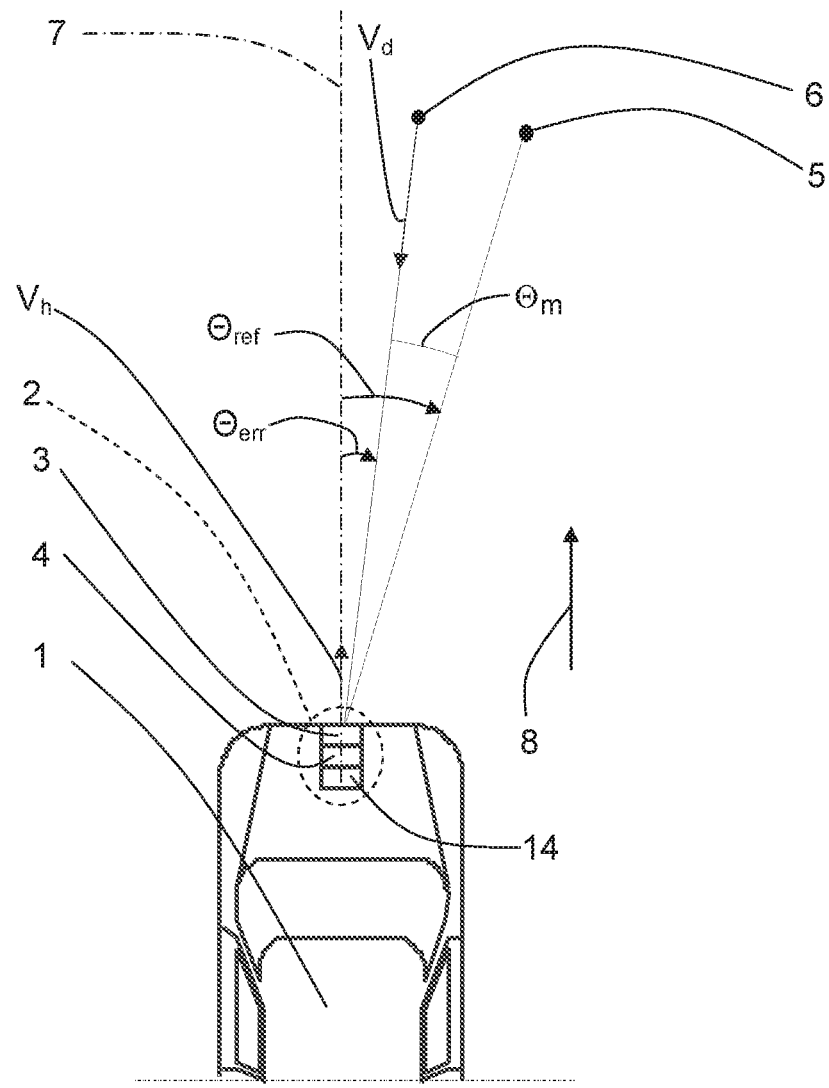
FIG. 1 shows a schematic top view of a vehicle with a radar system.

With reference to FIG. 1, a vehicle 1 includes a radar system 2, which in turn includes a radar detector 3 and a processing unit 4. The vehicle 1 is moving with a certain vehicle velocity $v_h$ and there is an object 5 present in the vehicle's path, where the object is detected by the radar detector 3. However, due to errors such as misalignment error, there is a detected object 6 that differs from the real object 5, such that there is a true target angle $\Theta_{ref}$ for the real object 5 and a detected target angle $\Theta_{err}$ for the detected object 6, where these angles are measured against a line 7 that extends from the vehicle 1, in its forward running direction 8. The line 7 may be regarded as extending in boresight of the radar detector 3. The radar detector 3 also detects a target Doppler velocity $v_d$ for the detected object 6 in a previously known manner.

With reference to the angles above, a misalignment angle $\Theta_m$ is defined as.

$$\Theta_m = \Theta_{ref} - \Theta_{err} \quad (1)$$

Figure 2:
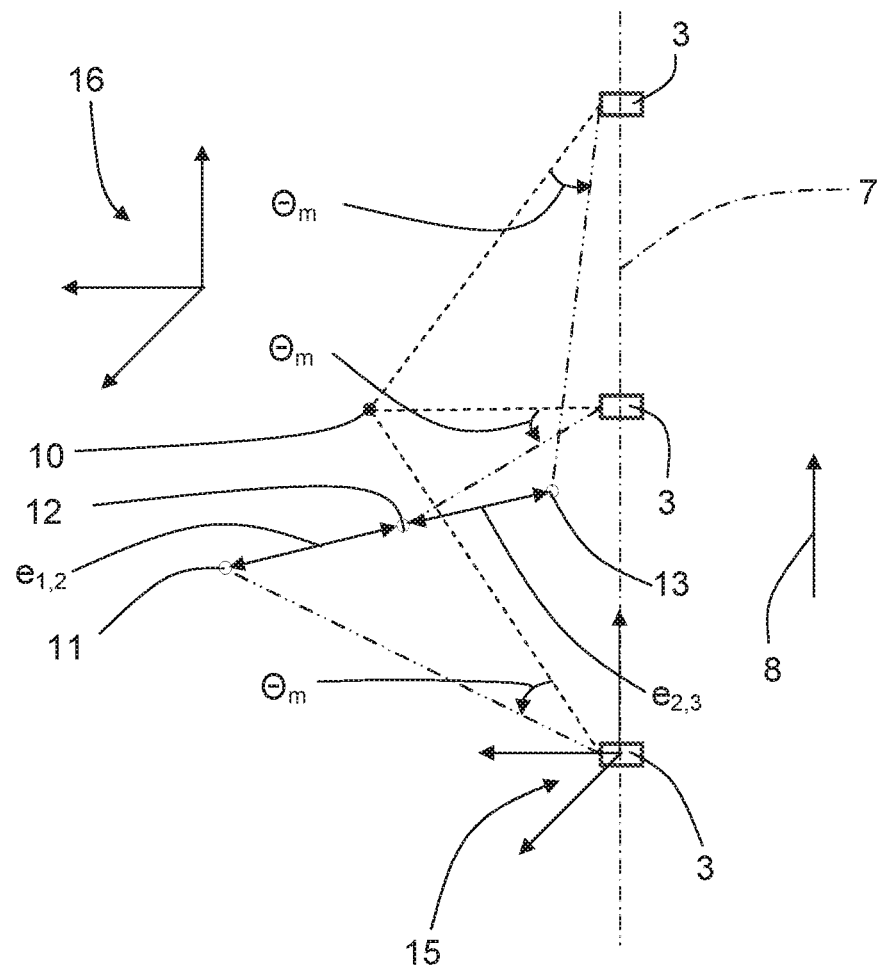
FIG. 2 shows a schematic top view of a radar detector at three different times.

With the above definitions made, FIG. 2 is now referred to. Here, only the radar detector 3 is shown at three different times corresponding to three successive radar cycles when passing a stationary object 10 along the line 7. It is in this example assumed that there is a misalignment angle $\Theta_m$ of the magnitude 30°.

In this context, there is a local coordinate system 15 that is fixed with respect to the radar detector 3, having local coordinates, and a global coordinate system 16 that is fixed with respect to the environment outside the vehicle 1, having global coordinates.

Due to the misalignment angle $\Theta_m$ of 30°, the object 10 is not seen at the same position in global coordinates over the three radar cycles. Instead, the object 10 is first detected at a first detected position 11, then at a second detected position 12 and finally at a third detected position 13.

According to the present disclosure, as shown in FIG. 1, the radar system 2 also includes a position detector 14 that is connected to the processing unit 4, where the position detector 14 is arranged to detect its present movement conditions, and may for example be constituted by one or more accelerometers, one or more vehicle dynamics acquisition arrangements, one or more cameras, one or more gyrometers or a GPS (Global Positioning System) arrangement.

The position detector 14 is thus arranged to detect the vehicle's present movements, which means that the position detector 14 is able to provide a link between the local coordinate system 15 and the global coordinate system 16, both these coordinate systems 15, 16 then being known to the processing unit 4. Coordinates may then be transformed between global coordinates and local coordinates. The position detector 14 may also be arranged to receive vehicle dynamics via a vehicle data bus, such as for example a CAN (Controller Area Network) bus.

A plurality of error correction factors may be applied to each detected position 11, 12, and 13 in local coordinates such that corrected detected positions are obtained. By use of the position detector 14, the processing unit 4 is enabled to then calculate the position of detected objects in the global coordinate system 16. The closer a certain error correction factor brings the misalignment angle $\Theta_m$ to 0° (no misalignment), the closer to each other the corrected detected positions 11, 12, and 13 will appear in global coordinates.

In the example with reference to FIG. 2, for a correction factor of 0°, the corrected detected positions will be the same as the detected positions 11, 12, and 13. A total error value $e_{1,3}$ is defined as a distance between the corrected detected positions. This means that the total error $e_{1,3}$ equals the sum of a first error value $e_{1,2}$, that is defined as a distance between the first corrected detected position and the second corrected detected position, and a second error value $e_{2,3}$, that is defined as a distance between the second corrected detected position and the third corrected detected position. This is illustrated in FIG. 2 where the corrected detected positions will be the same as the detected positions 11, 12, and 13 when the correction factor is 0°.

For a correction factor of 30°, all detected positions 11, 12, and 13 would, when being transformed to corresponding corrected detected position, be rotated back to the stationary object 10 and the total error $e_{1,3}$ would be 0.

With the goal of minimizing the total error $e_{1,3}$, a plurality of correction factors are tested, and the one that provides the lowest value for the total error $e_{1,3}$ is chosen; in this example a correction factor of 30° would be chosen.

Thus, while moving, the radar detector 3 detects a stationary object 10 and tracks it over several radar cycles; the three radar cycles in the example above is only an example, normally tracking takes place over many more cycles although it should be at least two radar cycles. The position of the stationary object 10 is transformed into a global coordinate system which is made possible by use of the position detector 14.

If the radar detector 3 is measuring range and angle correctly without measurement noise, the superposition of all detected positions will be in one and the same point in global coordinates.

If the radar detector 3 is measuring range and angle incorrectly, having an offset error, the superposition of all detected positions will result in a blurred cloud point in global coordinates. The larger the error, the higher is the extent of the blurred point cloud. Introducing measurement noise will introduce an added blur.

The procedure thus works in the following way:
1. Save the detected positions of a stationary tracked object during a plurality of radar cycles.
2. Test a plurality of different correction factors. For each correction factor the following steps are performed:
   a) Correct each detected position of the stationary object in the local coordinate system 15 by use of the current correction factor;
   b) Transform all corrected detected positions into the global coordinate system 16;
   c) Calculate an error/cost value of the current correction factor, for example by adding the distances between the transformed and corrected detected positions of successive radar cycles;
3. Choose the correction factor that results in the smallest error/cost value.

Different correction factors in local coordinates are thus tried and compared with each other in global coordinates.

The following is required for being able to perform the above steps.

The radar detector moves.

The radar detector's movement is known.

The radar system is able to classify an object as stationary or moving.

When a stationary object is found, the radar detector is able to track it over several radar cycles.

Figure 3:
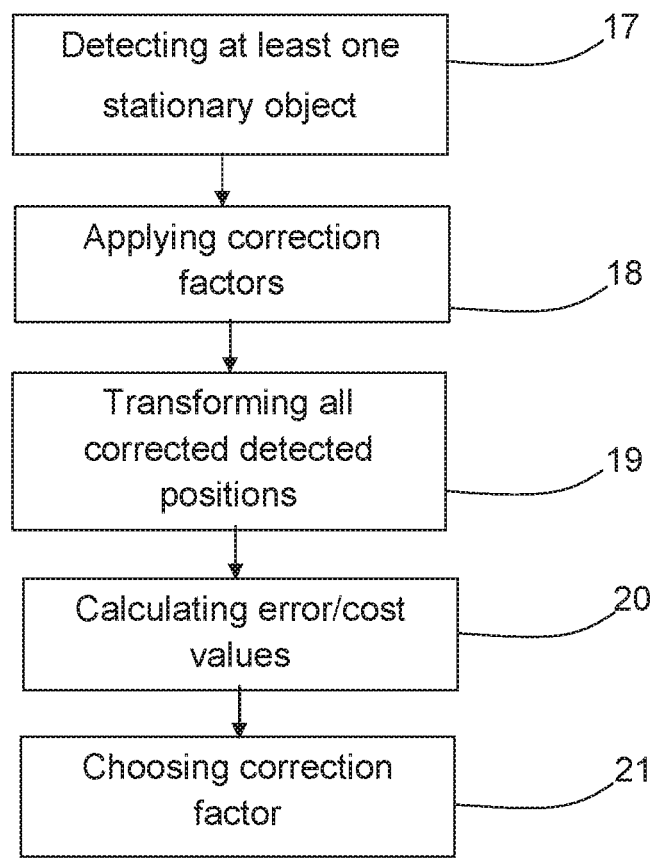
FIG. 3 shows a flowchart for a method according to the present disclosure.

With reference to FIG. 3, the present disclosure also relates to a method for estimating a vehicle radar system misalignment $\Theta_m$, where the vehicle radar system 2 is used for detecting objects outside a vehicle 1. The method includes:

Step 17: Detecting at least one stationary object 10 a plurality of times when moving in relation to the stationary object 10 such that plurality of detected positions 11, 12, 13 is obtained in a local coordinate system 15 that is fixed with respect to the radar detector 3, where the stationary object 10 is stationary with respect to a global coordinate system 16 that is fixed with respect to the environment outside the vehicle 1.

Step 18: Applying a plurality of correction factors on each detected position of the stationary object in the local coordinate system such that a plurality of corrected detected positions is obtained.

Step 19: Transforming all corrected detected positions into the global coordinate system 16.

Step 20: Calculating an error/cost value for each correction factor.

Step 21: Choosing the correction factor that results in the smallest error/cost value.

The present disclosure is not limited to the examples above, but may vary freely within the scope of the appended claims. For example, the radar system may be any type of Doppler radar system, such as for example a FMCW (Frequency Modulated Continuous Wave) system.

The microwave parts of the radar system 2 are assumed to be of a previously known design, and the radar system 2 includes more parts than shown, for example a radar transmitter, while a radar receiver is assumed to be part of the radar detector 3. The radar detector 3 may include a receiving antenna array. The radar system 2 may furthermore include a number of other parts, and is for example connected to a warning and/or information device comprised in the vehicle 1 in a previously known manner.

The processing unit 4 may include one or more control and/or processing units.

The radar system 2 may include one or several radar detectors 3.

The measured angles are defined as measured against a line 7 that extends from the vehicle 1, in its forward running direction 8. These angles may of course be measured against any suitable reference line or plane.

The error/cost value of a current correction factor has been defined as added the distances between transformed and corrected detected positions of successive radar cycles. However, this is only an example of an error/cost value; many other ways to determine a suitable error/cost value are of course possible. For example, variance and mean values may be used. The error/cost value should be a representation of to which extent a value matches a certain point.

The error/cost value may be derived from an error/cost function that has a minimum that is derived, for example by use of interpolation, slope analysis, non-linear optimization techniques and/or curve-fitting. A slope analysis may be used for analyzing slopes of the error/cost function, where each acquired slope is used for choosing the nest slope to be analyzed, successively reaching the minimum.

The error/cost function is then defined in the global coordinate system 16, and the desired correction factor is obtained by finding the minimum of the error/cost function.

A radar cycle is normally a procedure that is repeated a plurality of times, each radar cycle providing a certain set of data.

Figure 4:
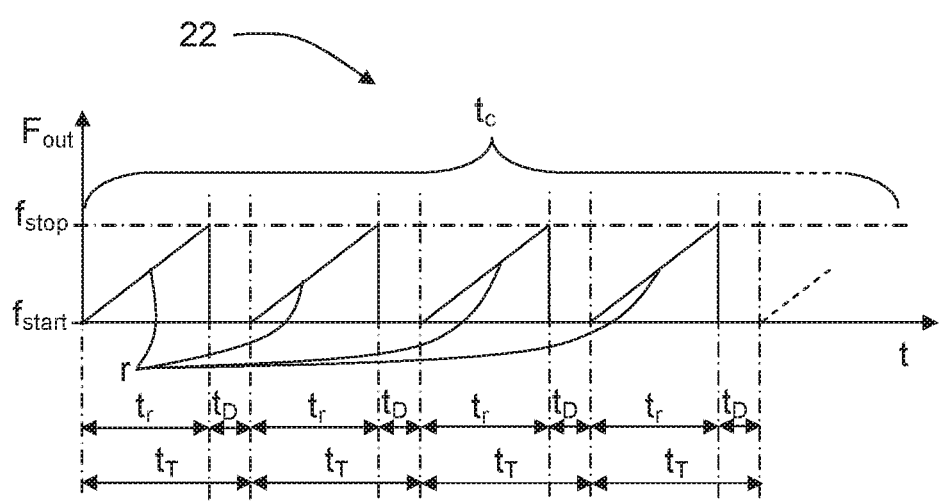
FIG. 4 shows a chirp signal.

As shown in FIG. 4, a transmitted signal in an FMCW system may be in the form of a so-called chirp signal 22 that is in the form of a continuous sinusoid where an output frequency $F_{out}$ varies from a first frequency $f_{start}$ to a second frequency $f_{stop}$ over the course of a ramp r, where each chirp signal 22 includes repeating cycles of a plurality of frequency ramps r. There the magnitude of the first frequency $f_{start}$ falls below the magnitude of the second frequency $f_{stop}$, although other alternatives exist; for example the magnitude of the first frequency $f_{start}$ may exceed the magnitude of the second frequency $f_{stop}$.

A radar cycle for a chirp signal 22 lasts for a certain cycle time $t_c$, each ramp r lasts a certain ramp time $t_r$, having a ramp period time $t_T$. Between two consecutive ramps of the chirp signal 22 there is a delay time $t_D$.

Other kinds of FMCW signals and FMCW signal configurations may result in other types of radar cycles, and other types of Doppler radar systems and Doppler radar signals may also result in other types of radar cycles.

Generally, the present disclosure relates to a vehicle radar system 2 arranged to detect objects outside a vehicle 1, the radar system 2 including a radar detector 3 and a processing unit 4, the radar detector 3 being arranged to detect at least one stationary object 10 a plurality of times when moving in relation to the stationary object 10 such that plurality of detected positions 11, 12, and 13 is obtained in a local coordinate system 15 that is fixed with respect to the radar detector 3, where the stationary object 10 is stationary with respect to a global coordinate system 16 that is fixed with respect to the environment outside the vehicle 1. The radar system 2 also includes a position detector 14 that is arranged to detect its present movement conditions with reference to the global coordinate system 16, where the processing unit 4 is arranged to:

Apply a plurality of correction factors on each detected position of the stationary object in the local coordinate system 15 such that a plurality of corrected detected positions is obtained;

Transform all corrected detected positions into the global coordinate system 16;

Calculate an error/cost value for each correction factor; and

Choose the correction factor that results in the smallest error/cost value.

According to an example of the present invention, each error/cost value is obtained by adding the distances between the transformed and corrected detected positions of successive radar cycles.

According to an example of the present invention, each error/cost value is obtained by variance or mean value calculations.

According to an example of the present invention, the processing unit 4 is arranged to define an error/cost function and to find a minimum of the error/cost function.

According to an example of the present invention, the processing unit 4 is arranged to find a minimum of the error/cost function by use of interpolation, slope analysis, non-linear optimization techniques and/or curve-fitting.

According to an example of the present invention, the position detector 14 is constituted by one or more accelerometers, one or more vehicle dynamics acquisition arrangements, one or more cameras, one or more gyrometers or a GPS, Global Positioning System, arrangement.

According to an example of the present invention, the radar system 2 is able to classify an object 10 as stationary or moving in the global coordinate system 16.

Generally, the present disclosure also relates to a method for estimating a vehicle radar system misalignment $\Theta_m$, the vehicle radar system 2 being used for detecting objects outside a vehicle 1, the method including the steps of:

Step 17: detecting at least one stationary object 10 a plurality of times when moving in relation to the stationary object 10 such that plurality of detected positions 11, 12, 13 is obtained in a local coordinate system 15 that is fixed with respect to the radar detector 3, where the stationary object 10 is stationary with respect to a global coordinate system 16 that is fixed with respect to the environment outside the vehicle 1;

Step 18: applying a plurality of correction factors on each detected position of the stationary object in the local coordinate system 15 such that a plurality of corrected detected positions is obtained;

Step 19: transforming all corrected detected positions into the global coordinate system 16;

Step 20: calculating an error/cost value for each correction factor; and

Step 21: choosing the correction factor that results in the smallest error/cost value.

According to an example of the present invention, each error/cost value is obtained by adding the distances between the transformed and corrected detected positions of successive radar cycles.

According to an example of the present invention, each error/cost value is obtained by variance or mean value calculations.

According to an example of the present invention, the method includes defining an error/cost function and finding a minimum of the error/cost function.

According to an example of the present invention, the method includes finding a minimum of said error/cost function by using interpolation, slope analysis, non-linear optimization techniques and/or curve-fitting.

According to an example of the present invention, all corrected detected positions are transformed into the global coordinate system 16 by using one or more accelerometers, one or more vehicle dynamics acquisition arrangements, one or more cameras, one or more gyrometers or a GPS, Global Positioning System, arrangement.

According to an example of the present invention, the method includes classifying an object 10 as stationary or moving in the global coordinate system 16.

While the above description constitutes the preferred embodiment of the present invention, it will be appreciated that the invention is susceptible to modification, variation and change without departing from the proper scope and fair meaning of the accompanying claims.

The invention claimed is:

1. A vehicle radar system arranged to detect at least a stationary object outside a vehicle, the radar system comprising, a radar detector and a processing unit, the radar detector being arranged to detect the stationary object a plurality of times when moving in relation to the stationary object such that a plurality of detected positions is obtained in a local coordinate system that is fixed with respect to the radar detector, where the stationary object is stationary with respect to a global coordinate system that is fixed with respect to the environment outside the vehicle, the radar system further comprises a position detector that is arranged to detect a present movement conditions with reference to the global coordinate system, where the processing unit is arranged to, apply a plurality of correction factors on the detected positions of the stationary object in the local coordinate system such that a plurality of corrected detected positions is obtained;

transform the corrected detected positions into the global coordinate system;

calculate an error/cost value for each of the correction factors; and choose the correction factor that results in a smallest error/cost value.

2. A vehicle radar system according to claim 1, further comprising in that the error/cost value is obtained by adding the distances between a transformed and a corrected detected position of successive radar cycles.

3. A vehicle radar system according to claim 1, further comprising in that the error/cost value is obtained by a variance or a mean value calculation.

4. A vehicle radar system according to claim 1, further comprising in that the processing unit is arranged to define an error/cost function and to find a minimum of the error/cost function.

5. A vehicle radar system according to claim 4, further comprising in that the processing unit is arranged to find a minimum of the error/cost function by use of at least one of an interpolation, a slope analysis, a non-linear optimization techniques or a curve-fitting.

6. A vehicle radar system according to claim 1, further comprising in that the position detector is constituted by one or more accelerometers, or one or more a vehicle dynamics acquisition arrangements, or one or more cameras, or one or more gyrometers, or a GPS arrangement.

7. A vehicle radar system according to claim 1, further comprising in that the radar system is able to classify a detected object as the stationary object or a moving object in the global coordinate system.

8. A method for estimating a vehicle radar system misalignment, the vehicle radar system being used for detecting objects outside a vehicle, the method comprising the steps of:

detecting at least one stationary object a plurality of times when moving in relation to the stationary object such that a plurality of detected positions is obtained in a local coordinate system that is fixed with respect to the radar detector, where the stationary object is stationary with respect to a global coordinate system that is fixed with respect to the environment outside the vehicle;

applying a plurality of correction factors on the detected positions of the stationary object in the local coordinate system such that a plurality of corrected detected positions is obtained;

transforming the corrected detected positions into the global coordinate system;

calculating an error/cost value for the correction factor; and choosing the correction factor that results in a smallest error/cost value.

9. A method according to claim 8, further comprising in that the error/cost value is obtained by adding the distances between a transformed position and a corrected detected positions of successive radar cycles.

10. A method according to claim 8, further comprising in that the error/cost value is obtained by a variance or a mean value calculations.

11. A method according to claim 8, in that the method further comprises defining an error/cost function and finding a minimum of the error/cost function.

12. A method according to claim 11, in that the method further comprises finding a minimum of the error/cost function by using at least one of an interpolation, a slope analysis, a non-linear optimization techniques or a curve-fitting.

13. A method according to claim 8, further comprising in that the corrected detected positions are transformed into the global coordinate system by using one or more accelerometers, or one or more vehicle dynamics acquisition arrangements, or one or more cameras, or one or more gyrometers or a GPS, arrangement.

14. A method according to claim 8, further comprising in that the method further comprises classifying a detected object as the stationary object or a moving object in the global coordinate system.

\* \* \* \* \*